United States Patent [19]
Chapman et al.

[11] Patent Number: 5,685,637
[45] Date of Patent: Nov. 11, 1997

[54] DUAL SPECTRUM ILLUMINATION SYSTEM

[75] Inventors: Mark Garland Chapman, San Bernardino; Laurence Hastings Bloxham, Los Angeles, both of Calif.

[73] Assignee: Jimmy G. Cook, Upland, Calif.

[21] Appl. No.: 522,989

[22] Filed: Sep. 8, 1995

[51] Int. Cl.⁶ ............................................. F22K 7/00
[52] U.S. Cl. .................... 362/263; 362/228; 362/244; 362/800
[58] Field of Search .................... 362/251, 62, 228, 362/229, 230, 231, 263, 265, 800, 237, 242, 244, 234, 240

[56] References Cited

U.S. PATENT DOCUMENTS

| | | | |
|---|---|---|---|
| 2,190,035 | 2/1940 | Loungway | 362/228 |
| 3,816,739 | 6/1974 | Stolov | 240/10 R |
| 4,677,533 | 6/1987 | McDermott et al. | 362/800 |
| 4,912,334 | 3/1990 | Anderson | |
| 4,947,291 | 8/1990 | McDermott | 362/19 |
| 4,963,798 | 10/1990 | McDermott | 315/312 |

FOREIGN PATENT DOCUMENTS

| | | | |
|---|---|---|---|
| 29143 | 2/1925 | France | 362/244 |

*Primary Examiner*—Y. My Quach
*Attorney, Agent, or Firm*—Jacobson, Price, Holman & Stern, PLLC

[57] ABSTRACT

The Dual Spectrum Illumination System (DSIS) is a modular light source having two independent emitters of optical radiation. A halogen bulb provides a high intensity visible beam. The second source of emissions is a ring of light emitting diodes (LED). The LED ring can be configured to supply area illumination, beam illumination, or a combination of area and beam illumination. The spectrum emitted by the LED is selectable from the wide range of commercially available diodes. The illumination system provides a beam and infrared area lighting using 21 high power, 6 watt, LEDs emitting at 880 nanometers mounted on the ring. Illumination control electronics are provided on a printed circuit assembly to provide the diodes with the correct current and voltage. A second embodiment of the invention is as a direct replacement for aircraft landing lights, mobile vehicle head lights, and any other situation requiring beam illumination. This embodiment of the DSIS provides high intensity beams of visible light and infrared light and is particularly suited for the U.S. Air Force covert operations.

19 Claims, 7 Drawing Sheets

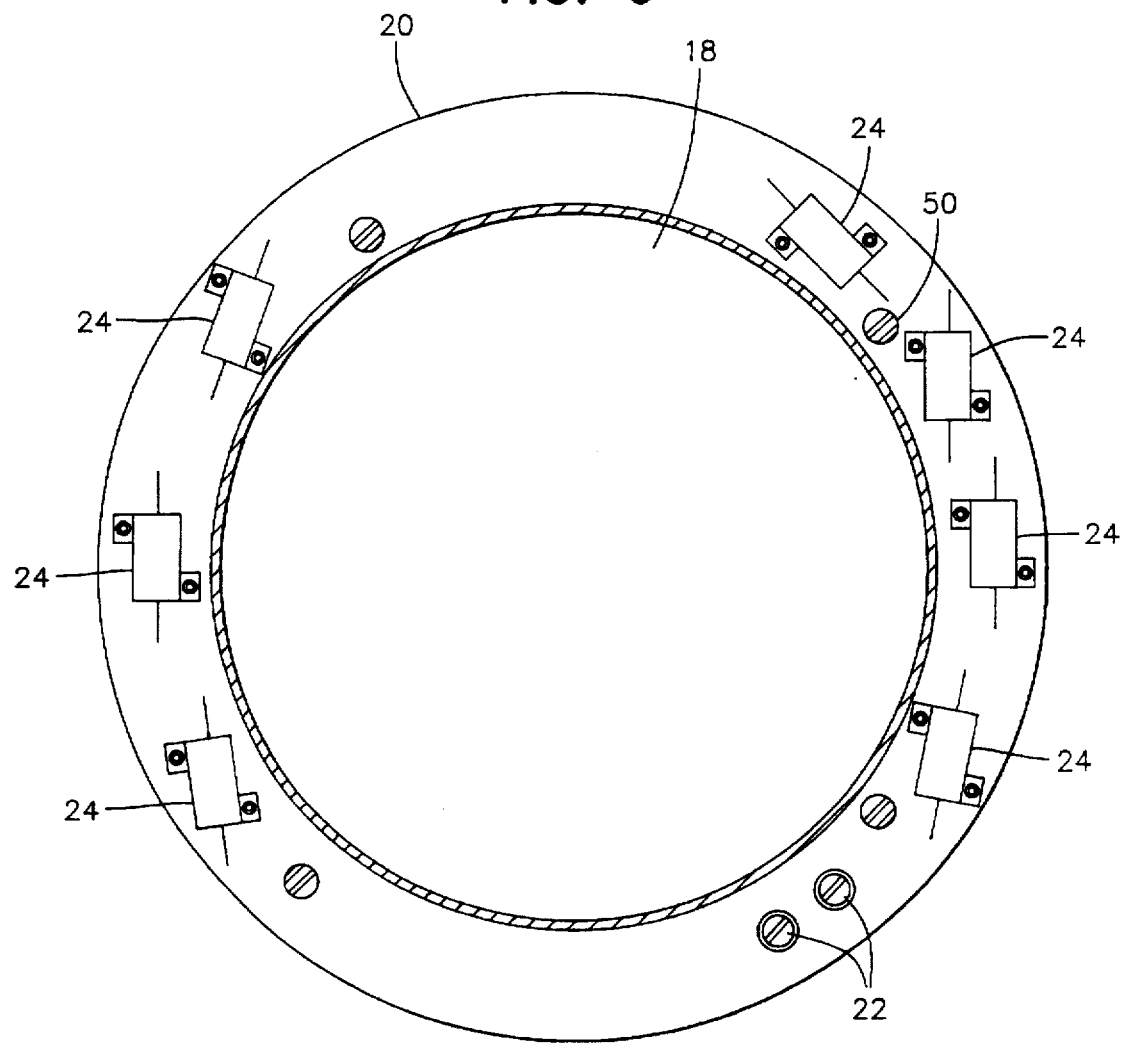

DUAL SPECTRUM ILLUMINATION SYSTEM

BACKGROUND

1. Field of the Invention

This invention relates to lighting, specifically the illumination of areas or beam lighting for use as aircraft landing lights and automobile headlights.

2. Description of the Prior Art

Heretofore, when a lamp, such as a sealed beam incandescent bulb, was used to provide a specific band of electromagnetic radiation, a filter or cold mirror was used to block the unwanted wavelengths. However, the filter or cold mirror trapped heat and the bulb operated at a temperature above the intended operating range. Consequently, the bulb burns out if operated for more than about 15 to 20 minutes and the excessive heat shortens the expected lifetime of the bulb by about 50%. In addition, changing the active spectrum required manual effort or a complex mechanical device to insert or remove the filter.

Another approach uses a dual bulb made with the reflecting surfaces pointing in opposite directions. To change the active spectrum, again a man or a complex mechanical device is needed to rotate the bulb. This approach requires a unique fixture and has relatively high cost.

Another fixture built for use on aircraft consists of four sealed beam lamps, two with cold mirrors and two unfiltered. The fixture, however, is a large complex assembly that is expensive to install on aircraft and also suffers from the bulb overheating problem described above.

Other lights are made using arc lamps, but these are also broad band and require filters with the same difficulties noted above to select specific bands of the spectrum.

SUMMARY OF THE INVENTION

Accordingly, it is a primary object of the invention to provide a modular light source particularly suited for use as aircraft landing lights, mobile land vehicle headlights, indoor or outdoor area illumination, and for use in like devices.

The invention provides two independent emitters of electro-magnetic radiation. One of the emitters is a halogen bulb that provides a high intensity visible beam of light. A second source of emissions is a ring of light emitting diodes (LED). The ring can be configured to provide area illumination, beam illumination, or a combination of area and beam illumination. The spectra emitted by the LED ring is selectable from the wide range of commercially available devices. The user can easily switch between the two available spectrum with an electrical switch. This ease of spectra selection has not been previously available.

A dual spectrum illumination system is comprised of two independent modular sources of illumination. Upon activation by an operator or user, the selected light source provides a high intensity beam of visible light, preferably by a halogen lamp. Alternatively, the user may select a high intensity beam or area illumination of infrared radiation, ultraviolet radiation, or any other region of the spectrum that can be produced by light emitting diodes. The diodes are mounted on a ring that circumscribes the halogen bulb. This ring accommodates many LED configuration. The dual spectrum illumination system is manufactured to be compatible with fixtures currently in use that house sealed beam and halogen lamps that only provide visible light. The selection of a specific spectra is accomplished all electronically and no mechanical action is necessary.

The advantages are extremely significant when the dual spectrum illumination system is used as a landing light for aircraft. The invention is a form, fit, and multi-function replacement for the standard aircraft landing light 4559. The installation of the invention on an aircraft only requires adding a three position switch and a single wire from the switch to the landing light.

The pilot can select to perform a normal landing by activating the halogen lamp, or he can decide to perform a covert landing by turning on the second spectra. For example, the LED ring can be populated by high power infrared light emitting diodes (LED). The LED light is invisible to the naked eye and night vision goggles must be used to see. The aircraft may land with the invisible landing light and cause minimal disturbance to the native population at the landing site.

The use of light emitting diodes solves the over heating problem and short operating lifetime of sealed beam lamps associated with the use of filters and cold mirrors. The LED has an expected lifetime of about 100,000 hours and will not over heat when operated with the current voltage and current.

The dual spectrum illumination system is designed to be interchangeable with landing lights currently in use on aircraft. Only one additional wire and a selection switch must be added to the current assembly. This is a significant advantage over the extensive modifications required to use mechanical filters and cold mirrors, wherein the bulb must be rotated, or the large and visible light having four sealed beam lamps, two with cold mirrors and two unfiltered.

The invention has special advantages for the U.S. Air Force. To an observer, a dual spectrum illumination system appears to be a normal aircraft landing light. The invention is less obtrusive than any prior art and is covert when used on aircraft equipped for night vision capable operations.

Still further objects and advantages will become apparent from a consideration of the ensuing description and accompanying drawings.

BRIEF DESCRIPTION OF THE DRAWINGS

FIG. 6 is a sketch showing the power conditioning and retaining ring used in the system shown in FIG. 1.

Figure 1:
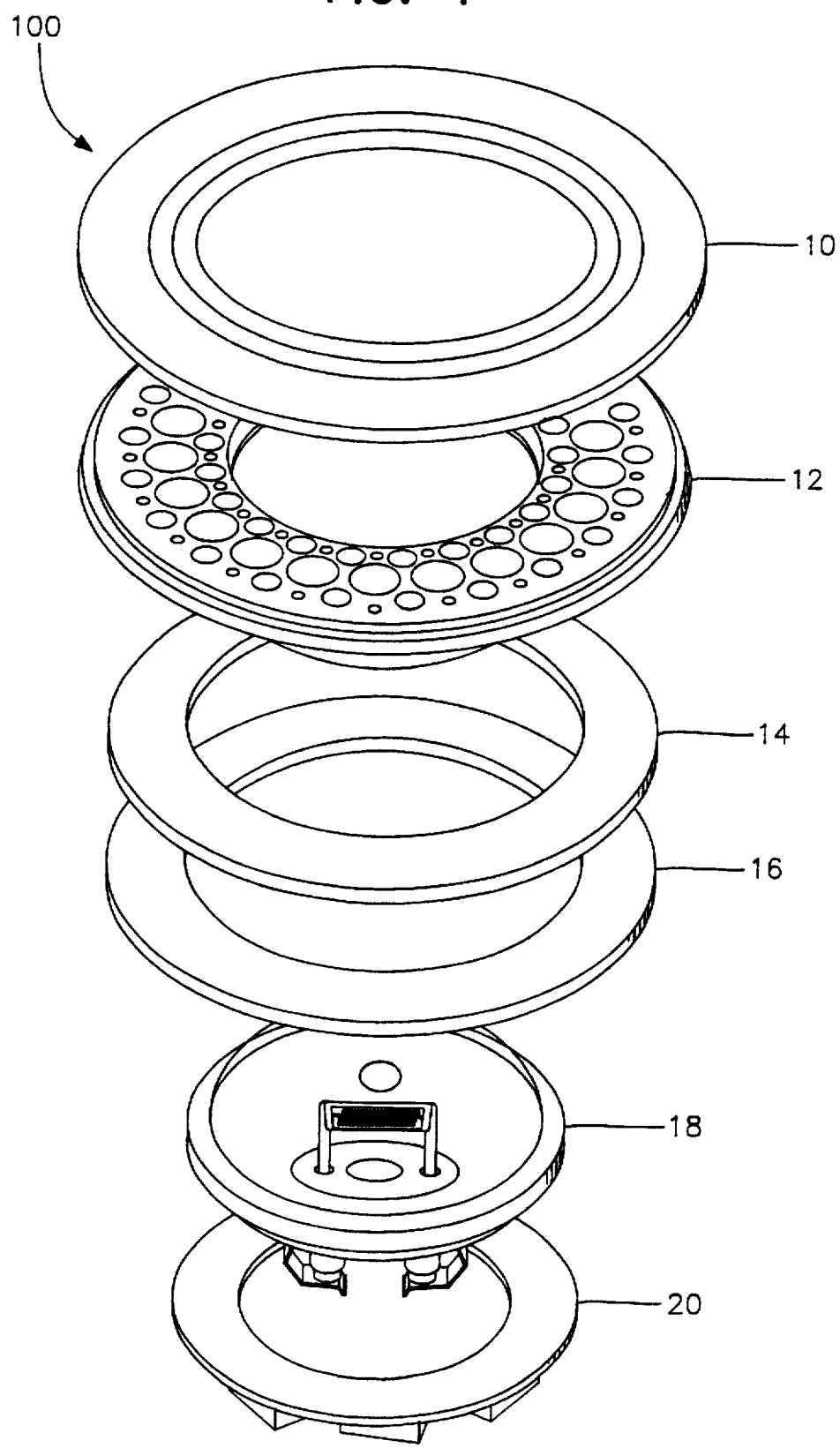
FIG. 1 is an exploded sketch of the Dual Spectrum Illumination System in accordance with the preferred embodiment of the invention.

Selected Reference Numerals 10 a protective lens
12 a LED mounting plate
14 a LED printed circuit assembly
16 an illumination controller printed circuit assembly
18 a halogen lamp
20 an electrical power conditioning and retaining ring
22 input terminals 24 seven current limiting resistors
26 40106 hex Schmitt trigger integrated circuit
28 high power light emitting diodes, OD669
30 N-channel MOSEFETs
32 OD50L light emitting diodes
34 plano-convex lens
36 halogen bulb

DETAILED DESCRIPTION OF THE PREFERRED EMBODIMENTS

As shown in FIG. 1, a Dual Spectrum Illumination System 100 is a modular light source. The Dual Spectrum Illumination System 100 consists of a protective lens 10, a LED mounting plate 12, a LED printed circuit assembly 14, and illumination controller printed circuit assembly 16, a visible illumination module, with a halogen lamp 18 as the principal component, and an electrical power conditioning and retaining ring 20. The illumination system provides two independent emitters of electro-magnetic radiation. The illumination system is controlled by a three position switch, not shown, (off/illumination 1/illumination 2). The selection of a specific illumination is accomplished with the simple three position switch, no complex mechanical or manual operation is required. The LED mounting plate 12 and the LED printed circuit assembly 14 may be configured to accommodate many different light emitting diodes.

The Dual Spectrum Illumination System 100 is designed to be used as a direct replacement for sealed beam lamps used on mobile vehicles. The initial application of the illumination system 100 is as a replacement for the standard 4559 landing light used on aircraft. The illumination system 100 provides both conventional visible illumination, as well as night vision capable illumination. The illumination system 100 is intended to be used during take-off and landing, as well as during operations while on the ground. The Dual Spectrum Illumination System 100 is designed to be easily converted to operate with a wide variety of light emitting diodes, in anticipation of the future, when night vision goggles will respond to light at wavelengths different from the current designs.

Figure 2:
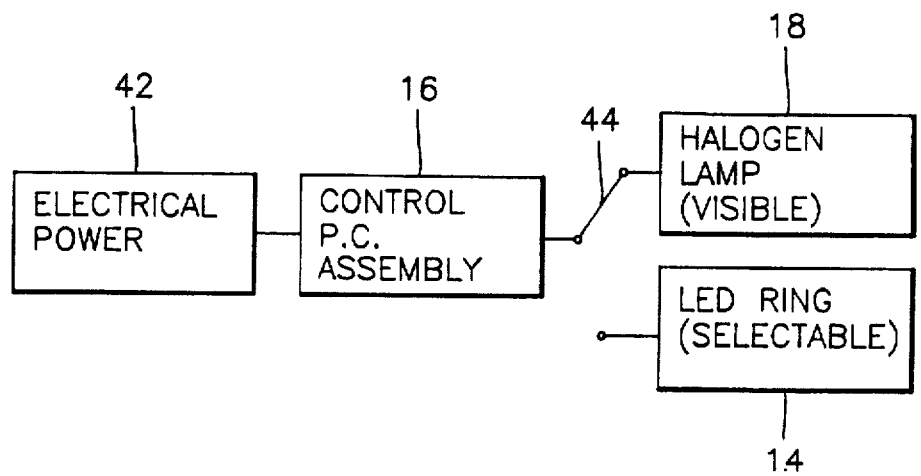
FIG. 2 is a block diagram of the system.

FIG. 2 shows a block diagram of a Dual Spectrum Illumination System 100 (DSIS). Electrical power 42 is supplied through the mode selection switch 44. The selection switch 44 determines the mode of operation of the system 100 by allowing the user to select the desired spectrum of light. The selection of visible illumination causes power to flow directly from the power supply 42 to the halogen lamp 18. The selection of a second spectrum activates the illumination control printed circuit assembly 16. The illumination controller 16 generates pulsed power at the correct voltage and duration for the optimum operation of the light emitting diodes 28, 32.

Figure 3A:
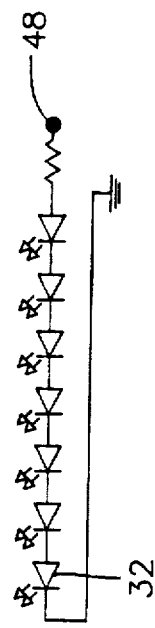
FIGS. 3a–3c are schematics of the electrical circuit of the invention.
Figure 3B:
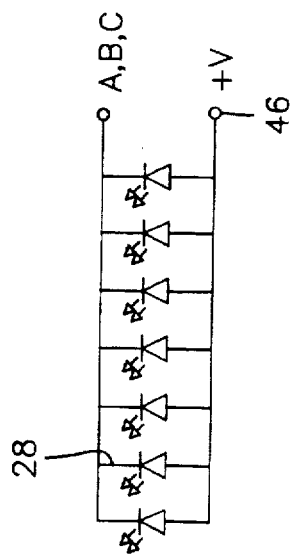
Figure 3C:
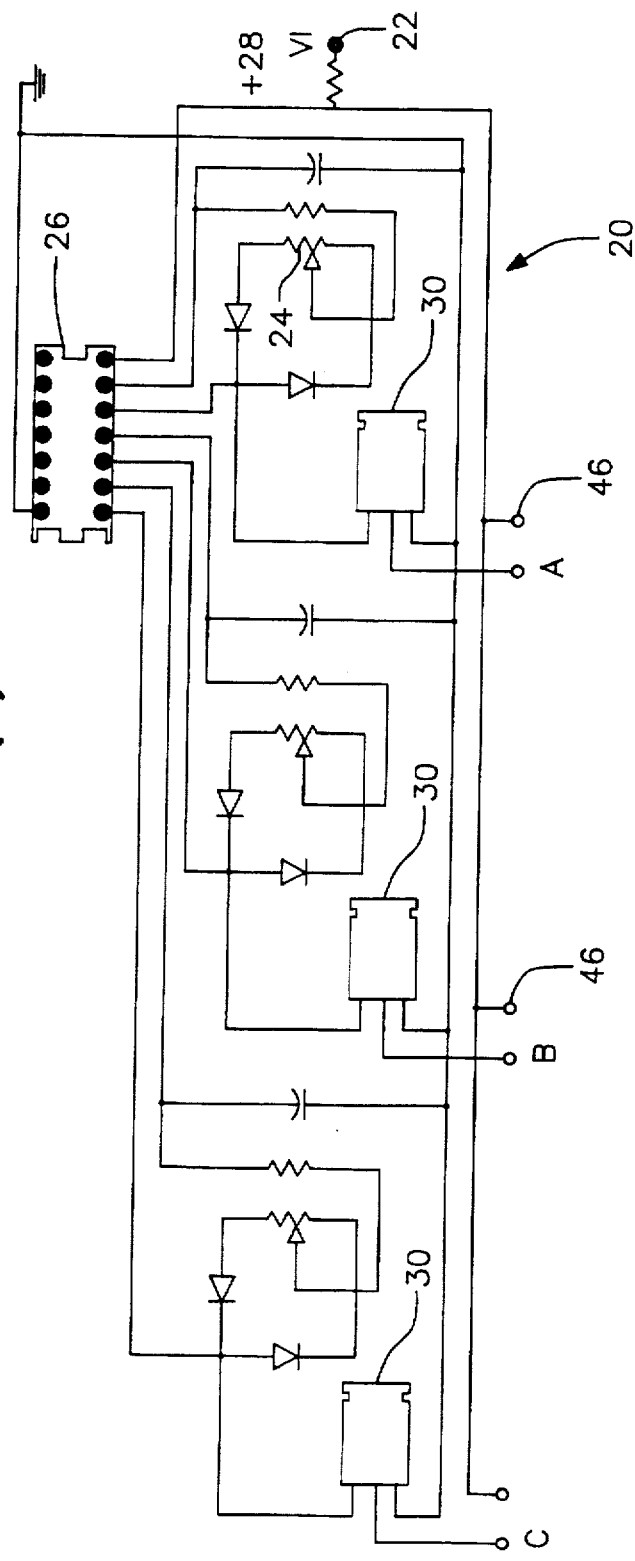

Now referring to FIGS. 3a–3c, a schematic for a Dual Spectrum Illumination System 100 is shown. Construction and use will be easily apparent to those skilled in the art given the values and interconnections shown, so it will not be discussed in great detail. A power supply will be selectively matched to the available main electrical power 42. The first Dual Spectrum Illumination System 100 was built for use on an aircraft that was wired to supply 28 VDC to the landing lights.

The power conditioning ring, item 20 on FIG. 1, receives the DC power via input terminals 22 and supplies DC power through seven current limiting resistors 24. Six of the resistors 24 are each directly connected to a series circuit of seven OD50L light emitting diodes 32 at terminals 46. Only one of these identical circuits is shown in FIG. 3b. The seventh resistor 24 connects to the illumination control circuit 16. The illumination control circuit 16 uses a standard 40106 hex Schmitt trigger integrated circuit 26 to generate pulses that switch the power used to drive the twenty-one high power light emitting diodes OD669 28, on the LED printed circuit assembly 14.

The variable resistors 24 control the pulse length and duty cycle of the timer. The circuit 26 uses three identical N-channel MOSFETs 30 that each supply power to seven of the light emitting diodes OD699 28, which are wired in parallel. These three circuits 26 are indicated by the letters A,B,C on the schematic. The MOSFETs 30 switch in response to the signals generated by the 40106 trigger 26 and each MOSFET 44 supplies about 13 VDC in 10 microsecond pulses at a duty cycle of 50%. When the switch 30 is positioned to turn on the halogen bulb lamp 18, a constant 28 VDC is supplied to the halogen bulb 36.

Figure 4:
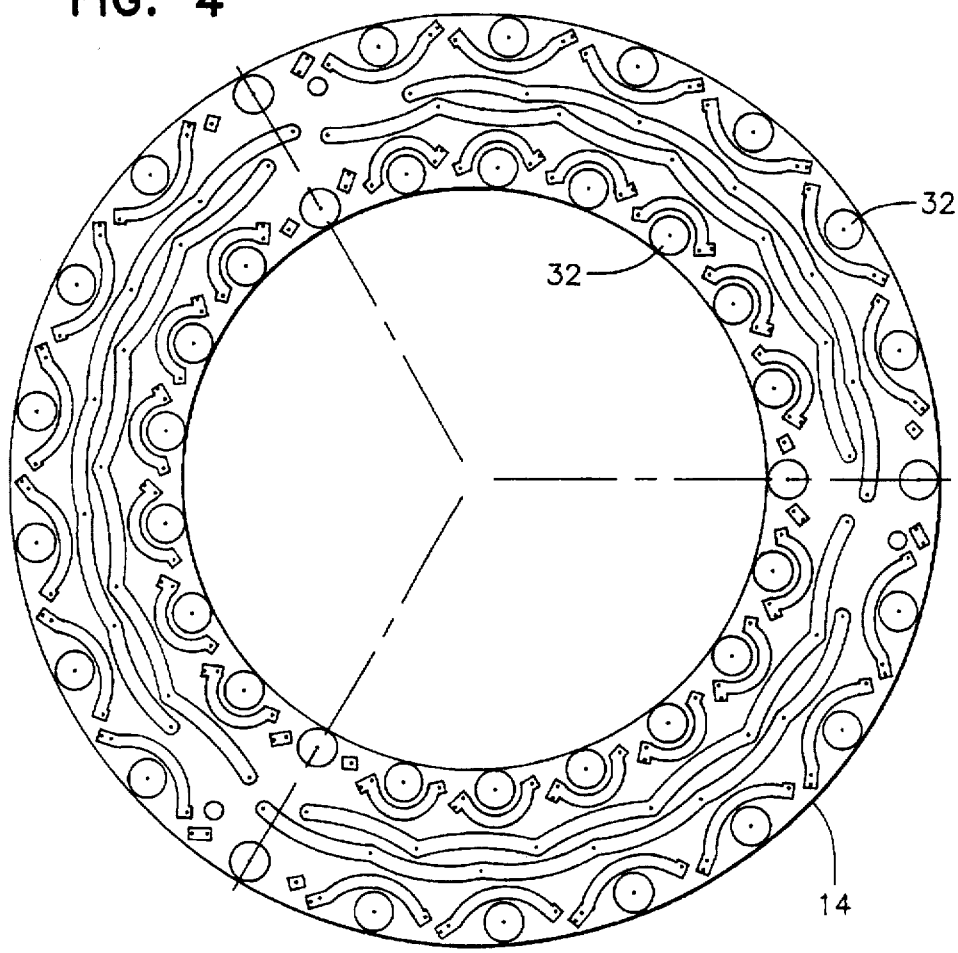
FIG. 4 is a sketch of the circuit side of the light emitting diode ring.

The circuit side of the light emitting diode (LED) ring 14 is shown in FIG. 4. The nine circuits connecting the light emitting diodes are shown. Around the inner and outer edges are the six circuits of seven OD50L LED's 32 connected in series. The center of the ring has the three circuits of seven OD669 high power LED's 28 connected in parallel. The first Dual Spectrum Illumination System 100 built used these sixty-three light emitting diodes 28, 32. Twenty-one of the LEDs are high power OD669 LED's 28 with power output of 6500 milliwatts each. Forty-two are OD50L LED's 32 that emit 500 milliwatts each for a total output of 157.5 watts of infrared illumination. Each light emitting diode OD669 28 is aligned with a plano-convex lens 34 on the LED mounting plate 12 to collimate and direct the infrared into a beam appropriate to illuminate landing fields.

Figure 5:
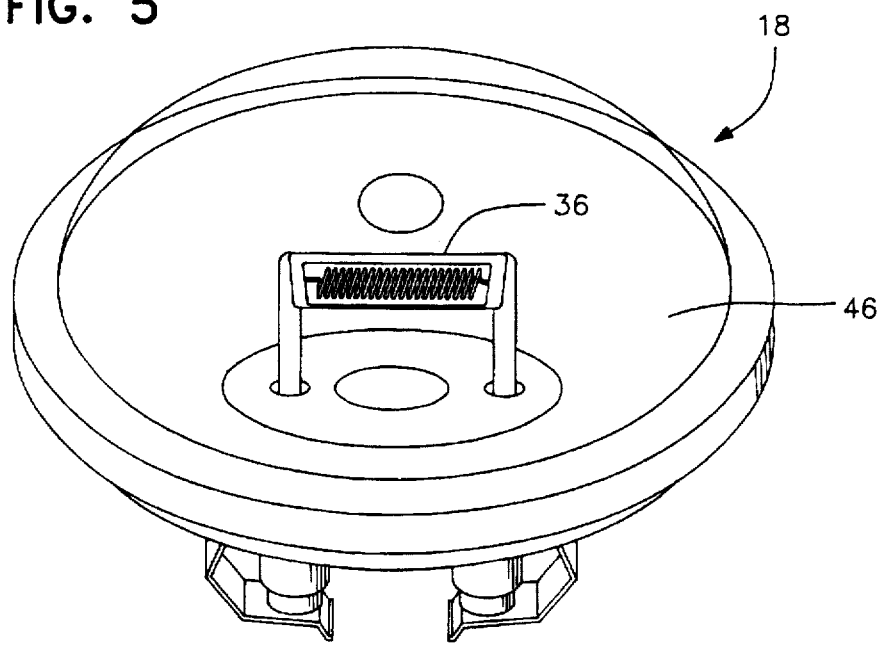
FIG. 5 is a sketch of the halogen lamp used in the system of FIG. 1.

The halogen lamp 18 is shown in FIG. 5. The 450 watt halogen bulb 36 is mounted near the focal point of a circular reflector 46. The reflector shapes the isotropic emissions from the halogen bulb to a beam for illuminating landing fields.

FIG. 6 shows the electrical power conditioning and retaining ring 20. The 28 VDC electrical power is connected to the terminals 22. The seven power limiting resistors 24 are mounted on the ring 20. The ring 20 is fastened to the LED mounting plate 12 by screws 50, which retain the halogen lamp 18 in position. This structure provides the necessary strength to operate in severe environmental conditions, such as are present on the wing of an aircraft.

Figure 7:
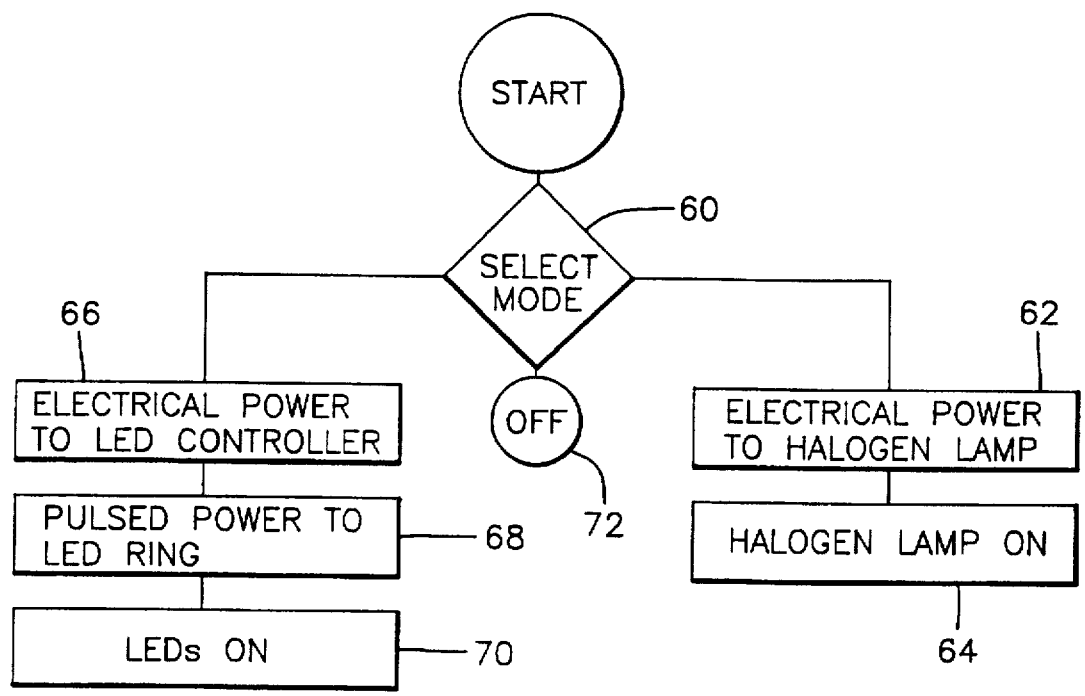
FIG. 7 is an operational flow chart for the invention.

FIG. 7 shows the sequence of operations that occur to control the Dual Spectrum Illumination System 100. The pilot has the option to select one of three options, off/visible/infrared, by setting the switch 44.

Figure 8:
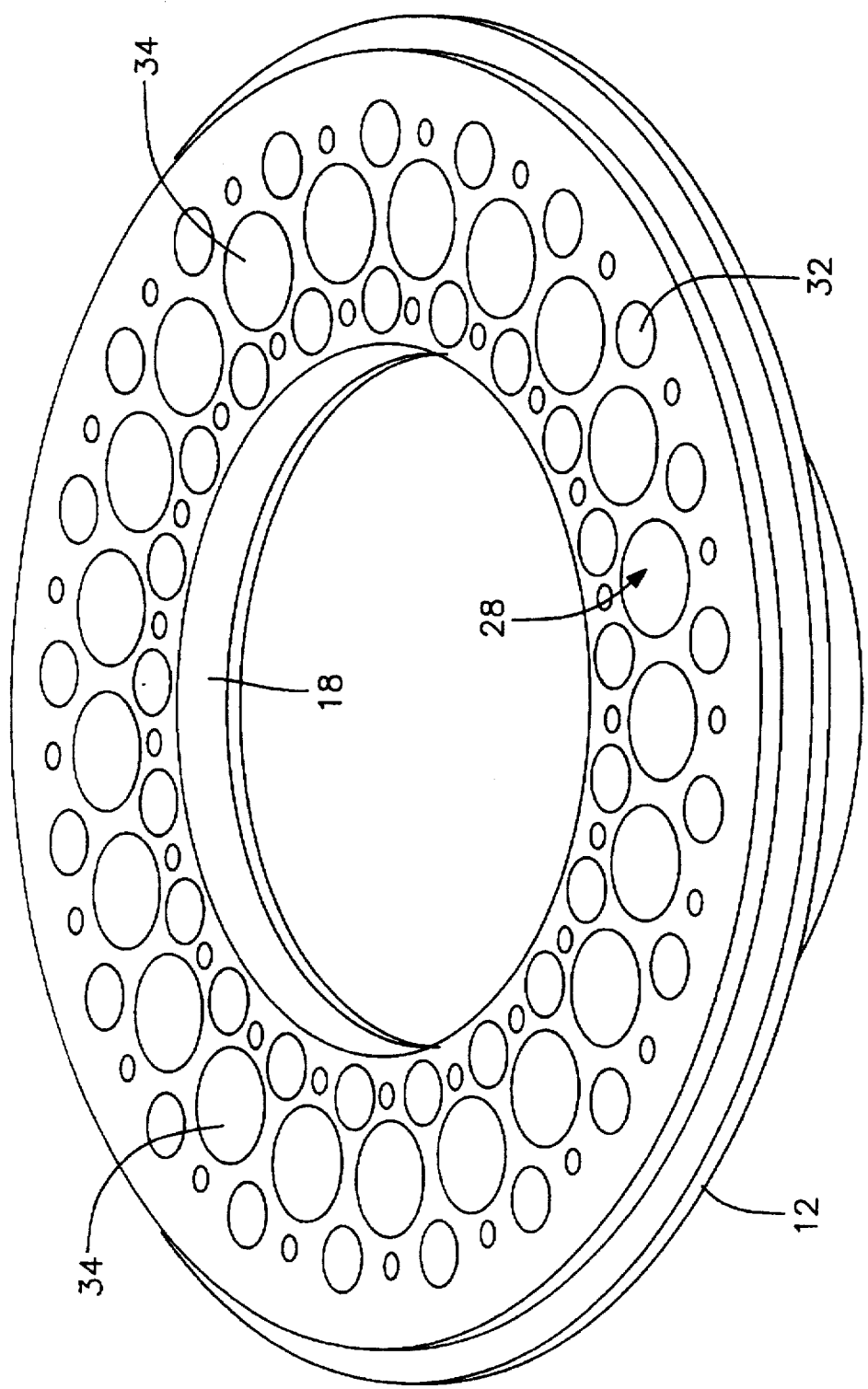
FIG. 8 is a perspective view of our invention of FIG. 1.

FIG. 8 is a sketch of the assembled invention in perspective view. The halogen lamp 18 with bulb 36 is mounted in the center. Surrounding the bulb 36 is the LED ring 12. Mounted on the under side of the ring 12 are the forty-two OD50L 32, and the twenty-one OD669 28 light emitting diodes. The lenses 34 for the OD669 are mounted on the top of the ring and collimate the infrared light emitted by the diodes 28.

Figure 9:
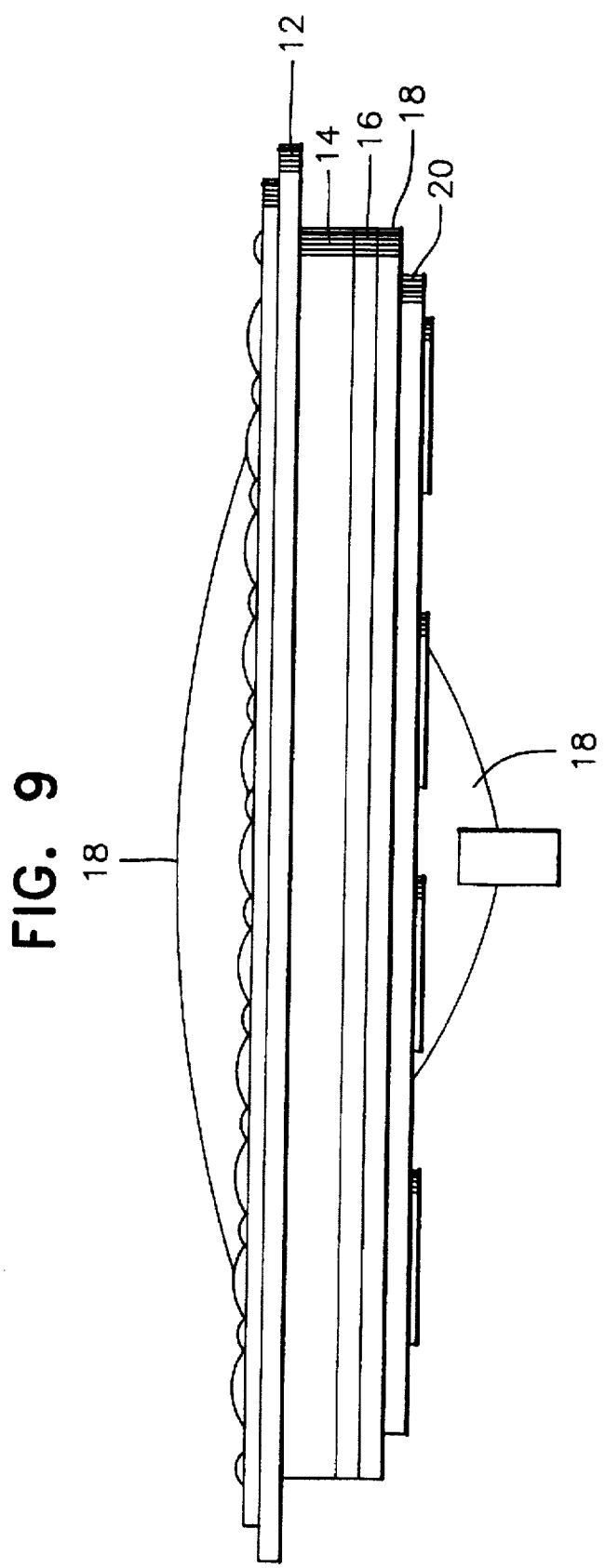
FIG. 9 is a side view of our invention of FIG. 1.

FIG. 9 shows the side view of the assembled invention. The current limiting resistors 24 are omitted for clarity. The size, shape, weight, and electrical requirements are compatible with all lamp housing used to hold the standard aircraft landing light PAR 4559.

The operation of the Dual Spectrum Illumination System 100 will now be described with reference to FIG. 7. When the pilot or operator sets switch 44 to the visible illumination position at step 60, the circuit, as shown in FIG. 2, is closed, thereby activating the halogen bulb 36, step 62. The bulb 36 remains on, step 64, continuously until the switch 44 is repositioned. When the switch 44 is set to the invisible illumination position, step 60, the circuit for the LED printed circuit assembly 44 is closed and current flows to the current limiting resistors 24 on the electrical power conditioning and retaining ring 20, step 66. The 42 LEDs OD50L 32 are driven directly in 6 circuits of seven LEDs each. The seventh resistor is connected to the LED control circuit, which pulses power to activate the OD669 LEDs 28 mounted on the ring, step 68. The second spectrum illumination is emitted, step 70, until switched off, step 72.

Accordingly, it can be seen that, according to the invention, we have provided a means to illuminate aircraft take-off and landing fields, mobile vehicle roadways, and other areas with either of two user selectable bands of the electro-magnetic spectrum. The invention is modular and can be easily reconfigured to provide different bands of illumination. A high intensity visible beam is available, as is a narrow band spectrum emitted by a ring of light emitting diodes. Said diodes may be infrared emitters for use with night vision goggles. Said diodes may be ultraviolet emitters for use with image intensifiers. Said diodes may be red, yellow, green, blue or any other color for monochrome visible lighting. An optical system with lenses to shape the LED illumination may be used to achieve specific intensity profiles.

Although the description above contains many specificities, these should not be construed as limiting the scope of the invention but as merely providing illustrations of some of the presently preferred embodiments of this invention. Various other embodiment and ramifications are possible within it's scope. For example, a dual spectrum illumination system could be used in a security system. At night the secure area could be flooded with invisible infrared or ultraviolet radiation. Suitable sensors would surveil the area and when unauthorized entry was detected, the visible lamp would be switched on to illuminate the intruder. The dual spectrum illumination system can also be a covert broadcast transmitter. By replacing the 40106 schmitt triggers 26 with a digital data stream using on off keying or other suitable modulation scheme, the invention can transmit digitized voice, video, or data messages.

Thus the scope of the invention should be determined by the appended claims and their legal equivalents, rather than by the examples given.

We claim:

1. A modular dual spectrum illumination system for mounting in a housing receptacle, the illumination system comprising:

a power conditioning and retaining ring for removably retaining a first illumination source for providing a first spectrum of light, the power conditioning and retaining ring further having input terminals for receiving electrical power and an electrical circuit connected to the input terminals to operatively provide conditioned power to the first illumination source;

an illumination source assembly ring mounted to said power conditioning and retaining ring for retaining a plurality of second illumination sources about the first illumination source for providing a second spectrum of light such that the first illumination source protrudes through a center of said illumination source assembly ring, wherein the electrical circuit is further connected to the plurality of second illumination sources to operatively provide conditioned power thereto; and, a ring-shaped mounting plate mounted to said illumination source assembly ring such that the first illumination source protrudes through a center of said mounting plate, said mounting plate having a plurality of lenses aligned with the plurality of second illumination sources to collimate light emitted from the plurality of second illumination sources.

2. The illumination system of claim 1, wherein light emitted from the first illumination source unobstructively passes through a center of each of the illumination source assembly ring and mounting plate.

3. The illumination system of claim 1, wherein the plurality of second illumination sources comprise light emitting diodes arranged concentrically about the first illumination source and on said illumination source assembly ring.

4. The illumination system of claim 1, wherein each of the plurality of second illumination sources comprise a light-emitting diode and each of the plurality of lenses comprises a plano-convex lens such that every plano-convex lens is aligned with a light-emitting diode.

5. The illumination system of claim 1, wherein the electrical circuit further comprises a switch for operatively switching power between the first and second illumination sources.

6. The illumination system of claim 1, further comprising a ring-shaped illumination controller mounted between said power conditioning and retaining ring and said illumination source assembly ring, wherein said illumination controller provides pulsed power to the second illumination sources.

7. The illumination system of claim 1, wherein the first illumination source comprises a halogen lamp.

8. The illumination system of claim 1, wherein the plurality of second illumination sources generate significantly less heat than the first illumination source.

9. The illumination system of claim 1, wherein the plurality of second illumination sources are particularly suited for use in covert operations.

10. A modular dual spectrum illumination system for mounting in a housing receptacle, the illumination system comprising:

a power conditioning and retaining ring for removably retaining a first illumination source for providing a first spectrum of light, the power conditioning and retaining ring further having input terminals for receiving electrical power and an electrical circuit connected to the input terminals to operatively provide conditioned power to the first illumination source;

an illumination source assembly ring mounted to said power conditioning and retaining ring for retaining a plurality of second illumination sources about the first illumination source for providing a second spectrum of light, wherein the electrical circuit is further connected to the plurality of second illumination sources to operatively provide conditioned power thereto;

a ring-shaped mounting plate mounted to said illumination source assembly ring, said mounting plate having a plurality of lenses aligned with the plurality of second illumination sources to collimate light emitted from the plurality of second illumination sources; and, a protective lens mounted to said mounting plate for protecting the illumination system.

11. The illumination system of claim 10, wherein the first illumination source protrudes through a center of each of the illumination assembly ring and mounting plate.

12. The illumination system of claim 10, wherein light emitted from the first illumination source unobstructively passes through a center of each of the illumination source assembly ring and mounting plate.

13. The illumination system of claim 10, wherein the plurality of second illumination sources comprise light emitting diodes arranged concentrically about the first illumination source and on said illumination source assembly ring.

14. The illumination system of claim 10, wherein each of the plurality of second illumination sources comprises a light-emitting diode and each of the plurality of lenses comprises a plano-convex lens such that every plano-convex lens is aligned with a light emitting diode.

15. The illumination system of claim 10, wherein the electrical circuit further comprises a switch for operatively switching power between the first and second illumination sources.

16. The illumination system of claim 10, further comprising a ring-shaped illumination controller mounted between said power conditioning and retaining ring and said illumination source assembly ring, wherein said illumination controller provides pulsed power to the second illumination sources.

17. The illumination system of claim 10, wherein the first illumination source comprises a halogen lamp.

18. The illumination system of claim 10, wherein the plurality of second illumination sources generate significantly less heat than the first illumination source.

19. The illumination system of claim 10, wherein the plurality of second illumination sources are particularly suited for use in covert operations.

* * * * *